US008279575B2

(12) United States Patent
Mao et al.

(10) Patent No.: US 8,279,575 B2
(45) Date of Patent: Oct. 2, 2012

(54) THERMALLY PROTECTED SURGE SUPPRESSION DEVICE

(75) Inventors: Xiaomao Mao, Foshan (CN); Tianyun Wei, Foshan (CN)

(73) Assignee: Prosurge Electronics Co., Ltd, Foshan (CN)

( * ) Notice: Subject to any disclaimer, the term of this patent is extended or adjusted under 35 U.S.C. 154(b) by 352 days.

(21) Appl. No.: 12/773,856

(22) Filed: May 5, 2010

(65) Prior Publication Data

US 2011/0170217 A1 Jul. 14, 2011

(30) Foreign Application Priority Data

Jan. 12, 2010 (CN) .......................... 2010 1 0019307

(51) Int. Cl.
*H02H 9/00* (2006.01)

(52) U.S. Cl. ...................................................... 361/124

(58) Field of Classification Search ................... 361/124
See application file for complete search history.

(56) References Cited

U.S. PATENT DOCUMENTS

| | | | | |
|---|---|---|---|---|
| 4,325,100 | A * | 4/1982 | Baumbach | 361/119 |
| 4,642,723 | A * | 2/1987 | Achtnig et al. | 361/124 |
| 8,129,648 | B2 * | 3/2012 | Zimmermann et al. | 218/158 |

* cited by examiner

*Primary Examiner* — Stephen W Jackson

(57) ABSTRACT

A thermally protected surge suppression device comprises a housing and a base seat with a mounting plate. The base seat is provided with a surge suppression component and a thermal protection device, and the thermal protection device further comprises a metal bulge electrically connecting to the electrode B of the surge suppression component, a compression spring, a slider provided with an arc extinguishing component movable on the guide-track groove. In normal working condition, the conductive metal member electrically connects to the metal bulge via a low temperature solder. When the surge suppression component fails, the low temperature solder is melt owing to being passed through the power frequency fault current, the conductive metal member is disconnected from the metal bulge, the compression spring pushes the arc extinguishing component to move to obstruct the disconnected gap, and form an airflow to extinguish the electric arc between the conductive metal member and the metal bulge. The present invention provides a safer, more timely and reliable circuit protection.

14 Claims, 7 Drawing Sheets

THERMALLY PROTECTED SURGE SUPPRESSION DEVICE

CROSS-REFERENCE TO RELATED APPLICATIONS

The present application claims the benefit of Chinese patent application No. 201010019307.8 entitled "THERMALLY PROTECTED SURGE SUPPRESSION DEVICE" which was filed Jan. 12, 2010. The entirety of the application is herein incorporated by reference.

FIELD OF THE INVENTION

The present invention relates to a circuit protection device, more particularly, to a thermally protected surge suppression device.

BACKGROUND OF THE INVENTION

Metal oxide varistor (MOV), a solid component made of polycrystalline semiconductor ceramic, is currently widely used in power lightning protection devices as an overvoltage suppressor component. Normally only slight leakage current passes through the solid component, but when MOV fails to work, it can receive a large power frequency fault current from a power source and catch fire. In order to prevent from catching fire, in a technical solution using a surge protection device (SPD) equipped with a MOV, a mechanical thermal protection mechanism is employed. Owing to good thermal coupling between the thermal protection mechanism and the MOV, once the thermal protection mechanism recognizes that the temperature of the MOV has risen to a certain value because of the heat generated by the MOV, leading to melting or softening of the low-fusing alloy within the thermal protection mechanism, the thermal protection mechanism takes actions to form a gap between the MOV electrode and the thermal protection mechanism, so the MOV power supply circuit is cut off, and the MOV temperature would no longer rise. Notwithstanding, in case the current been cut off is relative large, an electric arc is probably generated in the gap. If the electric arc could not be extinguished in time, the power frequency fault current continues passing through, and the problem that MOV fires can still not be solved.

Currently, expensive computers and electronic devices used in relation to computers with large-scale integrated circuits or ultra-large scale integrated circuits are widely used in a great number of electronic equipments, and the overvoltage tolerance of these electronic equipments is considerably poor, so a surge protection device has to be employed. Generally, the surge protection device is connected between the phase line and the ground line or the neutral line. During operating the MOV is kept to be applied with power supply voltage, that is to say, the MOV is on power supply state. MOV is characterized by its capability of enduring impulse current with thousands of amperes or larger and its incapability of enduring power frequency current or temporary overvoltage for a long time. In case that MOV fails to work (i.e., unavailable), the resistance thereof is decreased, and the MOV gets a power frequency fault current from the power source, which power frequency fault current is probably tens or thousands times larger than the normal leakage current. When the power frequency fault current flows through the MOV, the MOV is easy to be damaged and failed, and probably the temperature of the MOV is increased rapidly leading to catch fire.

For purpose of preventing failed MOV from catching fire owing to a power frequency fault current, in recent years, almost all manufacturers for the surge protection device around the world employs thermal protection measure in the surge protection device design. For instance, U.S. Pat. No. 6,430,019 to Martenson, et al., titled "Circuit Protective Device" therein disclosed a surge suppression device. Referring to FIG. 1 therein, the structure of the surge suppression device is modularized, with a MOV 112 and a thermal switch component 152 set therein, and a movable non-conductive shielding plate 188 is designed. When soldered joint 182 is disconnected, the shielding plate 188 is pushed into the disconnected gap between the thermal switch component and the MOV. However, the shielding plate is inserted into the gap with vertical motion, without the function of blowing the electric arc.

SUMMARY OF THE INVENTION

The present invention provides a thermally protected surge suppression device, which is capable of extinguishing the electric arc and providing a safer and more reliable circuit protection.

The embodiment of the present invention provides a thermally protected surge suppression device comprising of a housing and a base seat with a mounting plate; a surge suppression component, a thermal protection device, and a low temperature solder are set on the base seat; the surge suppression component is provided with an electrode a and an electrode b, and extension portion of the electrode a sticks out of the base seat to form a pin A of the surge suppression device; and the thermal protection device is provided with a conductive metal member, and the extension portion of the conductive metal member sticks out of the base seat to form the other pin B of the surge suppression device The thermal protection device further comprises a metal bulge electrically connecting to the electrode b of the surge suppression component, a compression spring, a slider moveable on the guide-track groove of the mounting plate, and an arc extinguishing component positioned at the top end of the slider; while the surge suppression device operates under rated voltage and rated current that is normal operation condition, the conductive metal member electrically connects to the metal bulge via the low temperature solder.

While the surge suppression component is out of work due to the considerable temporary overvoltage or the aging of components, and the resistance thereof is lowered and the power frequency fault current flows through the surge suppression component, the surge suppression component is heating up to make the low temperature solder melt, the conductive metal member is disconnected from the metal bulge, and the compression spring pushes the arc extinguishing component of the slider to move, so as to obstruct the disconnected gap, and form an airflow to extinguish the electric arc in the disconnected gap between the conductive metal member and the metal bulge.

Furthermore, the base seat with the mounting plate is capable of being pushed into the housing, and the inner portion of the housing is divided into two adjacent cavities by the mounting plate, namely a first cavity and a second cavity, with the surge suppression component being deposited in the first cavity, and the thermal protection device being deposited in the second cavity; the surge suppression component electrically connects to the thermal protection device by inserting the metal bulge into the second cavity.

Furthermore, the surge suppression component and the resin material with moisture-proof treatment are deposited in the first cavity; or the surge suppression component bare element without moisture-proof treatment is deposited in the first cavity, and then the resin material or the mixture of resin and quartz sand are poured therein.

For further improvements, the guide-track groove of the mounting plate is a guide-track groove tilted to the conductive metal member; while the surge suppression component fails, and the resistance thereof is lowered and the power frequency fault current flows through the surge suppression component, the surge suppression component is heating up to make the low temperature solder melt, the compression spring pushes the arc extinguishing component of the slider to move upwards, so as to push away the conductive metal member, then the disconnected gap between the conductive metal member and the metal bulge is obstructed, the airflow generated by the movement extinguishes the electric arc between the conductive metal member and the metal bulge. The guide-track groove is set at an angle of the ranges from 45 to 75 degrees with respect to the underside of the base seat, and cooperates with the compression spring to push the slider to move.

Further, the surge suppression component is a metal oxide varistor, a gas discharge tube or a hybrid connected in series by the gas discharge tube and the metal oxide varistor.

Furthermore, the conductive metal member is a L-shaped elastic conductive metal member, and when the low temperature solder melt, the L-shaped elastic conductive metal member flicks sideways and is automatically disconnected from the metal bulge; or the conductive metal member is a member with a soft flexible wire, and when the low temperature solder melt, the member with a soft flexible wire is pushed apart by the arc extinguishing component of the slider and disconnected from the metal bulge.

Furthermore, the arc extinguishing component is an arc extinguish chamber surrounded by a bottom side with three sidewalls and mounting plate, with a cavity body having an opening upwards setting therein; when the arc extinguishing component is pushed by the spring moving into place, the cavity body of the arc extinguishing component covers the metal bulge.

Furthermore, the arc extinguishing component may be made of common insulating fireproof plastic. To achieve better effect in arc extinguishing, the arc extinguishing component is constitute of high molecular polymer material which is capable of generating gas in case of arc ablation, and for example, the high molecular polymer material is resin, delrin or nylon.

Furthermore, the lower end of the slider is further equipped with a compression spring guide rod, which connects to the compression spring; the upper end of the slider is provided with a working condition indication bar, which is adapted for stretching out of the housing to indicate the working condition of the thermal protection device during the slider is moving.

In one embodiment, the sidewall of the second cavity is further equipped with a shock absorption spring and a micro switch, and the micro switch connects to the two-pin connector located at the top side of the mounting plate via leads; when the slider is moving, the micro switch is triggered, so as to control the operation of the warning circuit which is connected to the two-pin connector.

In another embodiment, a metal driving slice and a micro switch are arranged on the top side of the mounting plate; when the slider moves to press the metal driving slice, the warning circuit which is connected to the micro switch is triggered to work.

The embodiment of the present invention provides a thermally protected surge suppression device, and the thermal protection device thereof employs the arc extinguishing component with a cavity. Not only the movement of the arc extinguishing component functions in blowing and extinguishing the electric arc, but also the cavity of the arc extinguishing component covers the metal bulge, which enables the perimeter of the metal bulge isolated from the conductive metal member, to prevent the electric arc from moving around leading to short circuit, break the circuit timely and more safely, and solve the problem that the power frequency fault current flows through the surge suppression component to cause fires. The guide-track groove of the mounting plate is a guide-track groove tilted to the conductive metal member. When the compression spring pushes the arc extinguishing component of the slider to move upwards, on one hand, it provides the lateral thrust to push away the metal member, increases the disconnected safety distance, and the arc resistance to lower electric arc current; on the other hand, it obstructed the disconnected gap between the conductive metal member and the metal bulge.

In comparison with applying non-conductive shielding plate to forcibly isolate the electric arc in the prior art, the embodiment of the present invention provides a thermally protected surge suppression device with the function of extinguishing the electric arc by blowing and cooling the arc, thereby lowering the risk of the damage on the system caused by the back electromotive force due to the sudden change of the current, which possibly brings the counter-surge to the system.

The inner portion of the housing is divided into two adjacent cavities by the mounting plate, namely the first cavity and the second cavity the first cavity is provided with the surge suppression component deposited therein, and the second cavity is provided with the thermal protection device deposited therein. In such manner the two independent cavities are insulated and fire-retardant, and can prevent from burning out the other electronic components. Moreover, the surge suppression component and the resin material with moisture-proof treatment are deposited in the first cavity; or the surge suppression component bare element without moisture-proof treatment is deposited in the first cavity, and then the resin material or the mixture of resin and quartz sand are filled therein. And it facilitates the fireproofing of the surge suppression component in case of failure. Furthermore, the surge suppression component is not easy to explode when the big surge current happens. The existing MOV is processed by common epoxy coating, and the coating layer would probably explode under the big surge current.

BRIEF DESCRIPTION OF THE DRAWINGS

The accompanying drawings facilitate full understanding of the various embodiments of this invention, wherein.

DETAILED DESCRIPTION OF ILLUSTRATED EMBODIMENTS

Figure 1:
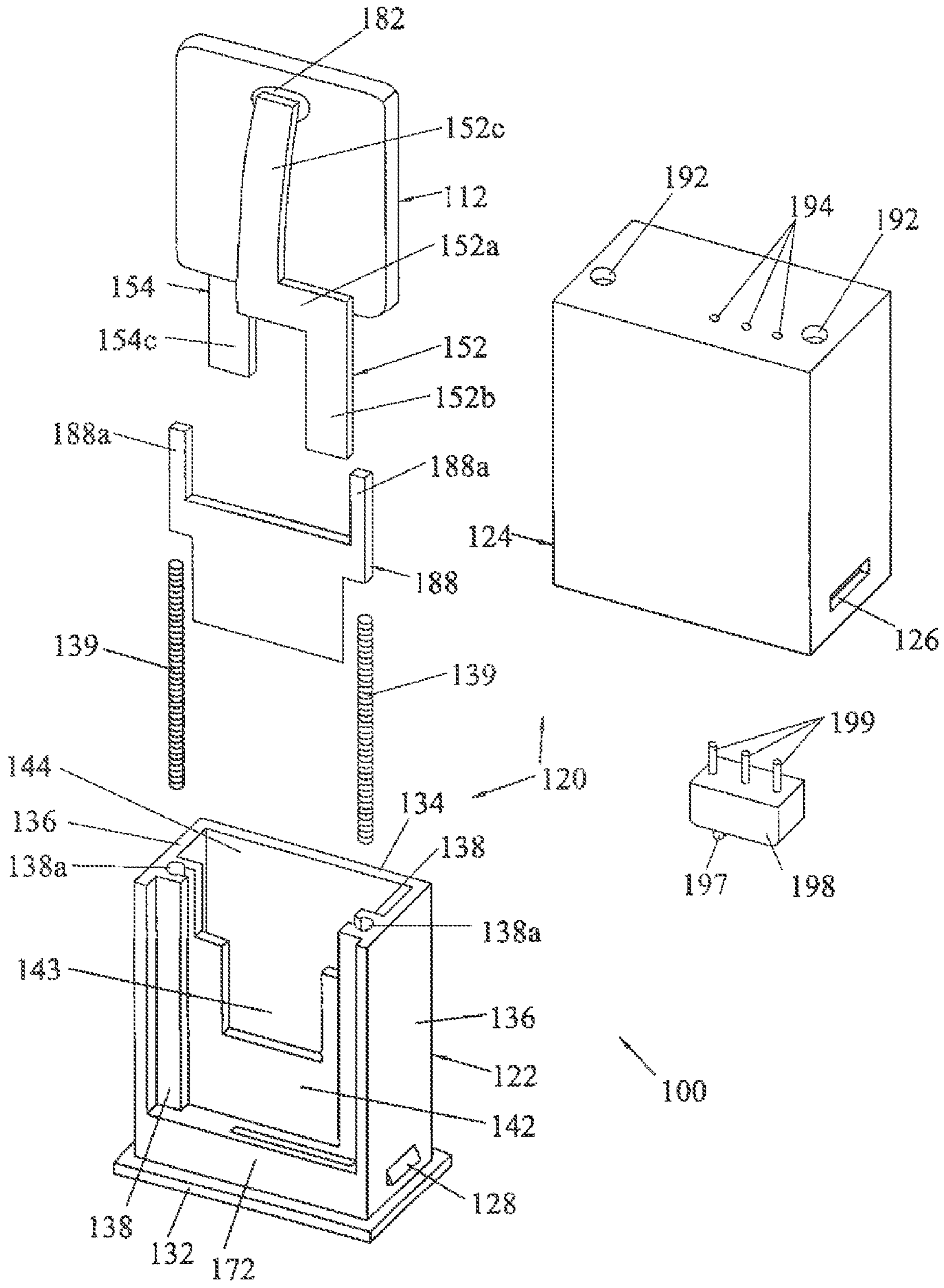
Fig. 1 (prior art)
FIG. 1 is a perspective view illustrating a circuit protective device according to the prior art.
Figure 2:
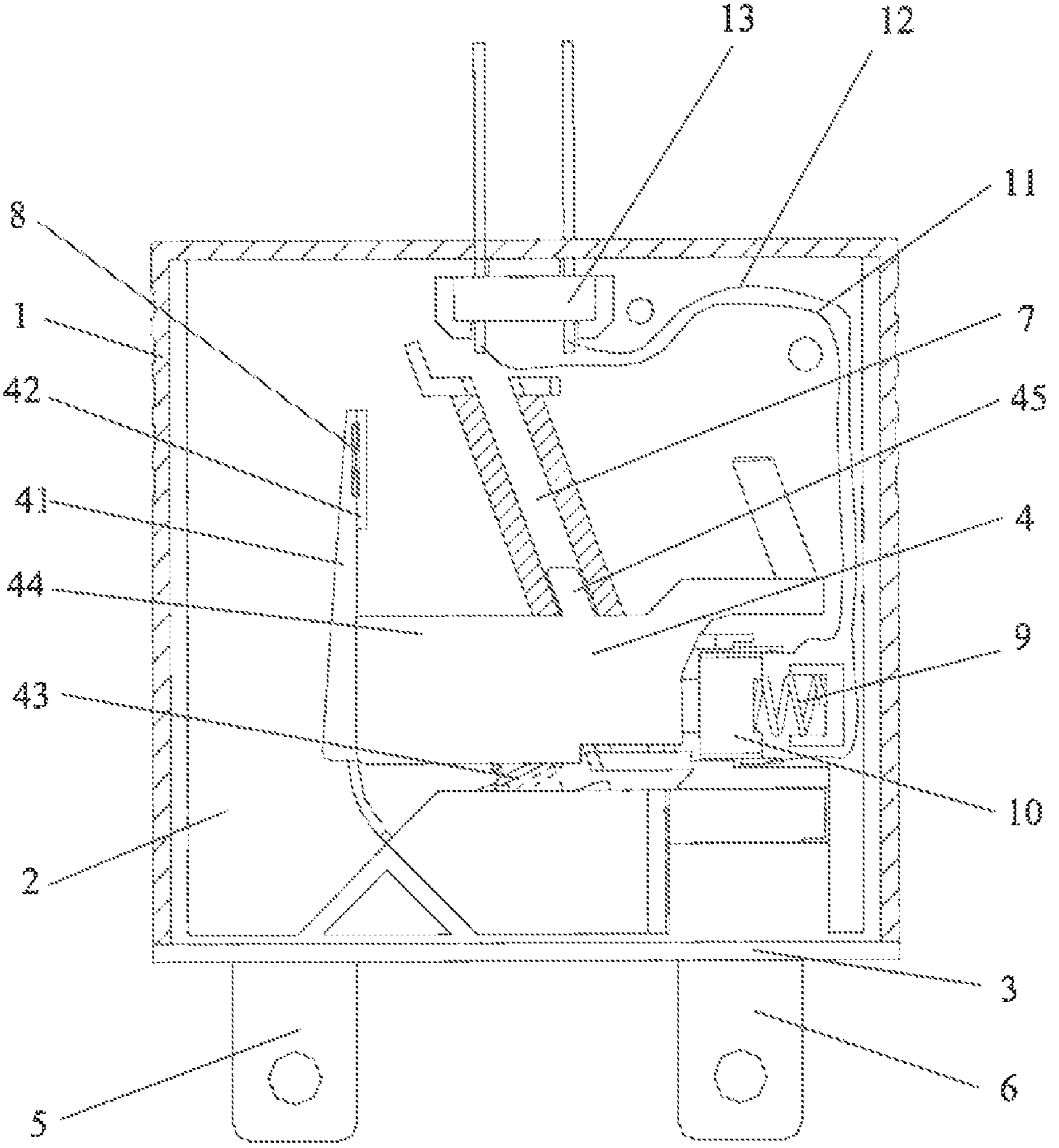
FIG. 2 is a side elevation illustrating the thermally protected surge suppression device in normal operation state according to one embodiment of the present invention.

For purpose of making the object, the technical solution and the advantage of the present invention more clear, the present invention will now be further described with reference to the figures and the embodiment hereinafter As seen in FIG. 2, the first embodiment according to the present invention provides a thermally protected surge suppression device which includes a housing 1 made of engineering plastics and a base seat 3 with a mounting plate 2. A surge suppression component (it is located on the reverse side and not shown in FIG. 2) and a thermal protection device 4 are set on the base seat. The extension portion of an electrode a of the surge suppression component sticks out of the base seat to form a pin A 5 of the surge suppression device. The thermal protection device includes a conductive metal member 41, and the extension portion of the conductive metal member 41 sticks out of the base seat to form the other pin B 6 of the surge suppression device.

The thermal protection device 4 further comprises a metal bulge 42 electrically connecting to the electrode B of the surge suppression component, a compression spring 43, and a slider 45 with an arc extinguishing component 44 made of engineering plastics. The slider 45 is movable on the guide-track groove 7 of the mounting plate. When the thermally protected surge suppression device is in normal operation, the conductive metal member 41 electrically connects to the metal bulge 42 via a low temperature solder 8. The soldering pad may be made of low-melting alloy, and the melting point value thereof normally ranges from 90° C. to 180° C., which is lower than the ignition temperature of the surge suppression component.

The guide-track groove 7 of the mounting plate is a guide-track groove tilted to the conductive metal member. when the surge suppression component gets fail, and the resistance thereof is lowered and the power frequency fault current flows through the surge suppression component, the surge suppression component is heating up to make the low temperature solder melt. As the conductive metal member is disconnected from the metal bulge, the compression spring pushes the arc extinguishing component of the slider to move upwards, so as to push away the conductive metal member 41, then obstruct the disconnected gap between the conductive metal member and the metal bulge. The guide-track groove is set at an angle ranges from 45 degree to 75 degree with respect to the underside of the base seat, for example tilted with 70 degree. The guide-track groove cooperates with the compression spring to push the slider to move.

The surge suppression component is a metal oxide varistor, a gas discharge tube, or a hybrid connected in series by the gas discharge tube and the metal oxide varistor. For example, the surge suppression component is employing metal oxide varistor according to this embodiment.

The conductive metal member 41 is a L-shaped elastic conductive metal member. When the low temperature solder is melt, the L-shaped elastic conductive metal member flicks sideways, and is automatically disconnected from the metal bulge. The sidewall of the second cavity is further equipped with a shock absorption spring 9 and a micro switch 10. And the micro switch connects to the two-pin connector 13 located at the top side of the mounting plate via two leads 11 and 12. The shock absorption spring 9 possesses buffer function. Under normal conditions, when stricken by the lightning, it is probably that the conductive metal member 41 would be shocked and cause thermal deformation etc, under the lightning strick, but the button of the micro switch 10 stands against the sidewall of the slider. Because there is a gap between the guide-track and the slider in practice, when the slider may sway right and left, no loosen is for the button of the micro switch. When the slider moves upwards, the micro switch 10 is triggered, so as to control the operation of the warning circuit which is connected with the two-pin connector 13.

Figure 3:
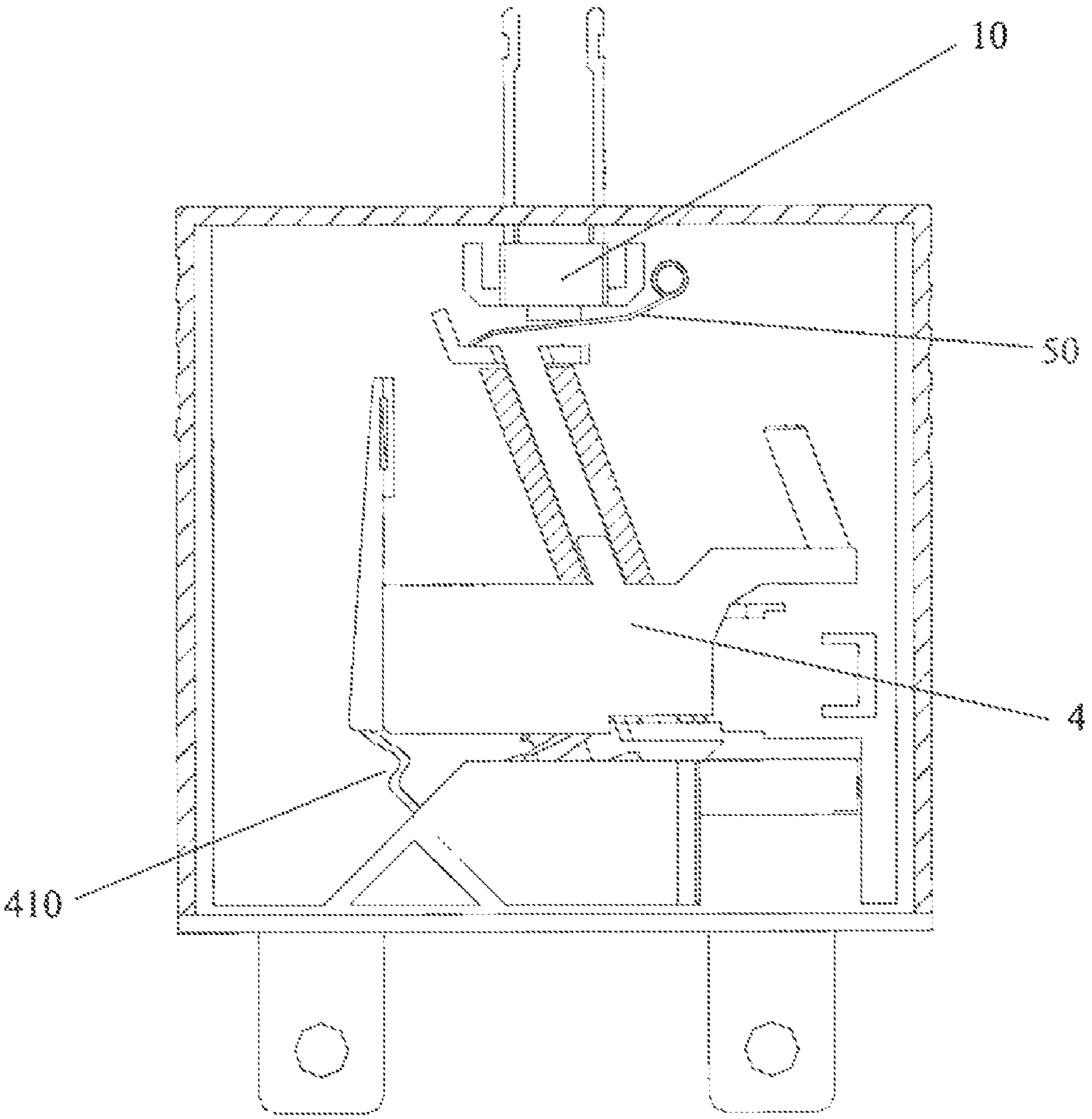
FIG. 3 is a side elevation illustrating the thermally protected surge suppression device in normal operation state according to one embodiment of the present invention.

Referring to FIG. 3, as the second embodiment, the differences compared to the first embodiment are as follows.

The conductive metal member 41 could also be the metal member with a middle portion of a flexible wire 410. Because the flexible conductor metal member is non-elastic, when the low temperature solder melt, the flexible conductor metal member is pushed apart by the arc extinguishing component of the slider, and is disconnected from the metal bulge.

No shock absorption spring and micro switch are set on the sidewall of the second cavity, and no two-pin connector is mounted thereon.

The top side of the mounting plate is equipped with a metal driving slice 50 and a micro switch, and the metal driving slice 50 functions as a lever. When the slider moves to press the metal driving slice, the warning circuit connected to the micro switch is triggered to work.

Figure 4:
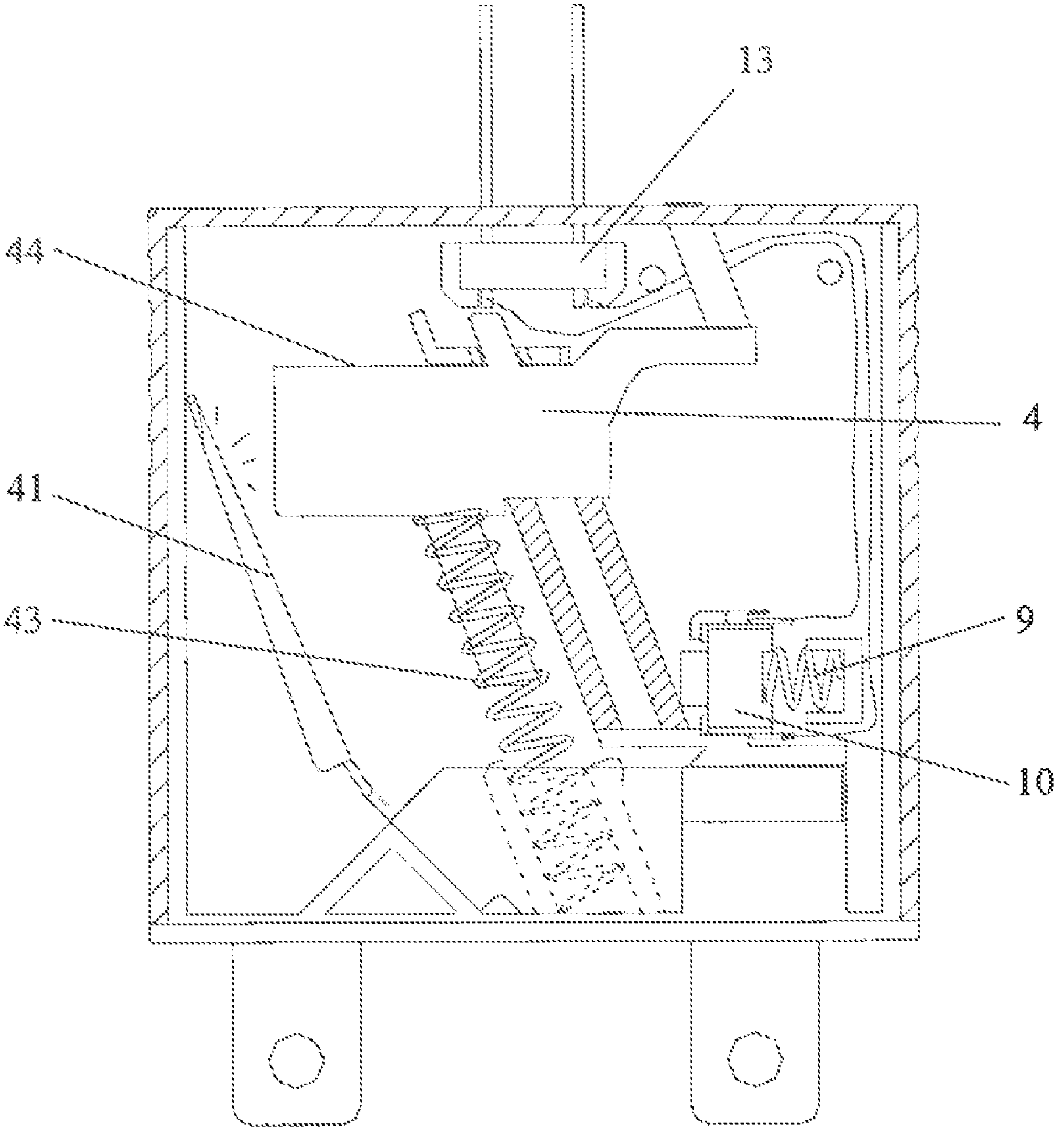
FIG. 4 is a side elevation illustrating the thermal protection device of triggered the thermally protected surge suppression device according to one embodiment of the present invention.

As seen in FIG. 4, while the surge suppression component fails, and the resistance thereof is lowered and the power frequency fault current flows through, the surge suppression component is heating up to make the low temperature solder melt and the conductive metal member 41 is disconnected from the metal bulge 42. The compression spring 43 pushes the arc extinguishing component 44 of the slider to move upwards, so as to push away the conductive metal member 41, obstruct the disconnected gap between the conductive metal member and the metal bulge and generate an airflow to extinguish the electric arc between the conductive metal member 41 and the metal bulge 42. When the slider moves upwards, the micro switch 10 is triggered, to control the warning circuit which is connected to the two-pin connector 13.

Figure 5:
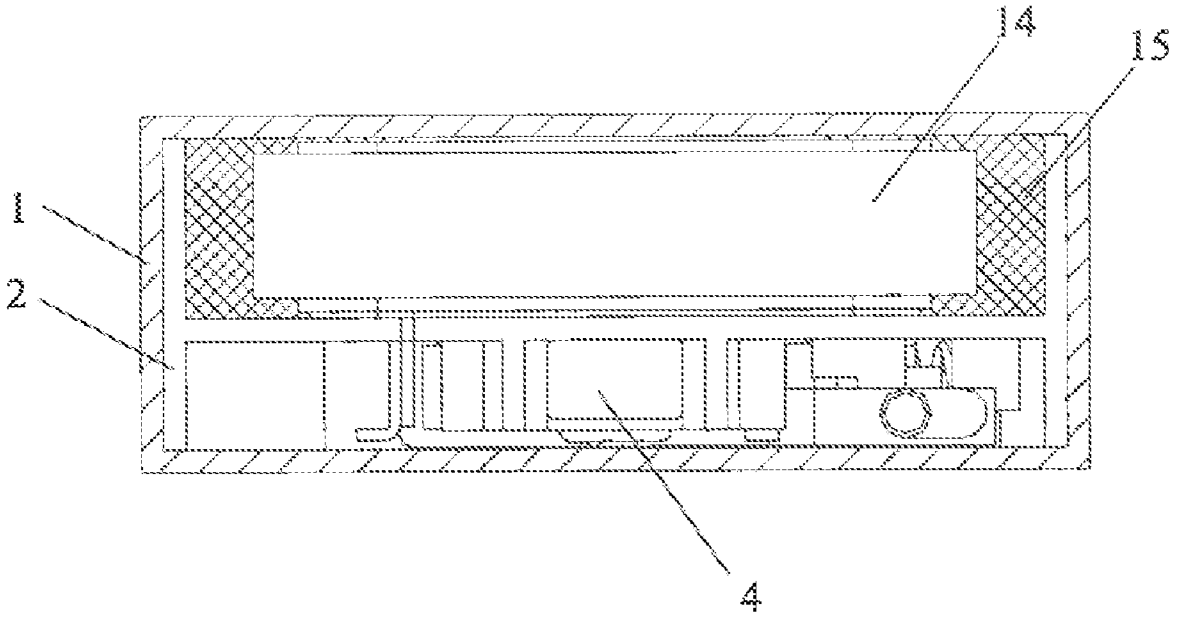
FIG. 5 is a sectional top view illustrating thermally protected surge suppression device according to one embodiment of the present invention.

As seen in FIG. 5, for all the above-mentioned embodiments, the base seat with the mounting plate is capable of being pushed into the housing 1. And the inner portion of the housing is divided into two adjacent cavities by the mounting plate 2, namely a first cavity and a second cavity. The surge suppression component 14 is deposited in the first cavity, and the surge suppression component may be a metal oxide varistor, a gas discharge tube or a hybrid connected in series by the gas discharge tube and the metal oxide varistor. The thermal protection device 4 is deposited in the second cavity; the surge suppression component electrically connects to the thermal protection device by inserting the metal bulge into the second cavity.

The surge suppression component 14 and the resin material 15 with moisture-proof treatment are deposited in the first cavity; or the surge suppression component bare element without moisture-proof treatment are deposited in the first cavity, then the resin material is filled therein, e.g. epoxy resin, silicone or the mixture of resin and quartz sand.

Figure 6:
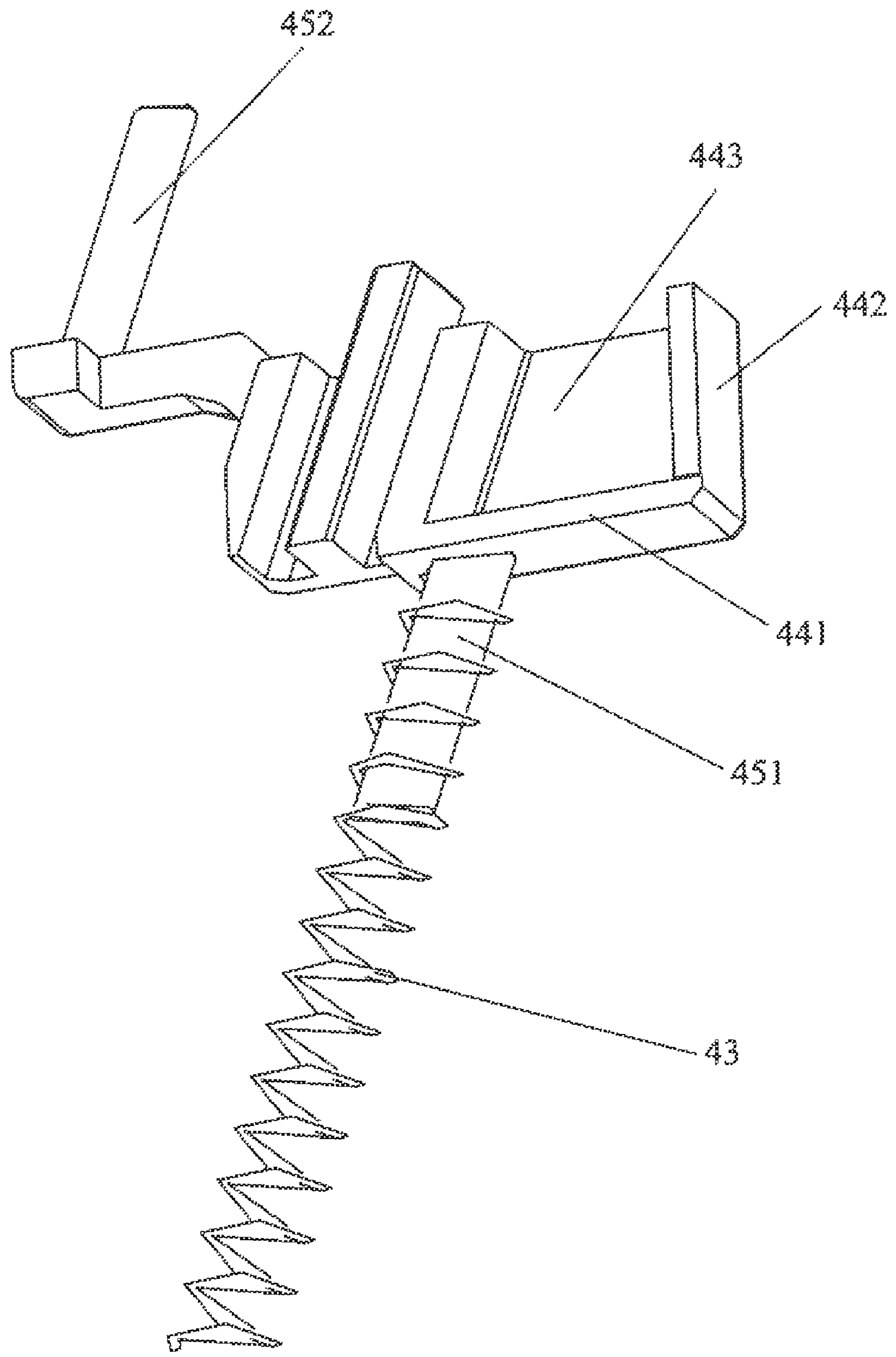
FIG. 6 is a perspective view illustrating the slider with the arc extinguishing component according to one embodiment of the present invention.

As seen in FIG. 6, for all the above-mentioned embodiments, the arc extinguishing component 44 of the slider 45 is an arc extinguishing chamber surrounded by a bottom side 441 with three sidewalls 442 and mounting plate, with a cavity body 443 having an opening upwards setting therein. An air flow is generated when the compression spring pushes the arc extinguishing component to move, to extinguish the arc. When the arc extinguishing component is pushed by the spring moving into place, the cavity body of the arc extinguishing component covers the metal bulge. Not only the electric arc is extinguished, but also the metal bulge is completely covered and isolated from the electric arc and disconnected from the electrode b of the surge suppression component, to prevent the longer electric arc from moving around leading to short circuit.

The arc extinguishing component might be made of common insulating fireproof plastic. Certainly, in order to achieve better effect on arc extinguishing, the arc extinguishing component might be made of high molecular polymer material which is capable of generating gas in case of arc ablation, and the high molecular polymer material may be such as resin, delrin, or nylon. When compression spring drives the slider to move, the arc extinguishing component covers the electric arc, the electric arc burns the sidewall of the inserted arc extinguishing cavity, and plenty of gas of delrin or nylon polymer is generated. On one hand, it is useful for cooling the electric arc; on the other hand plenty of gas drives the electric arc plasma to spread outwards quickly, which enables the electric arc blowed and extinguished promptly.

The lower end of the slider is further equipped with a compression spring guide rod 451 connecting to the compression spring 43. The upper end of the slider is provided with a working condition indication bar 452, which is adapted for stretching out from the signal output hole of the top end of the housing, to indicate the working condition of the thermal protection device when the slider is moved. If the working condition indication bar stretches out from the housing, it indicates that the thermal protection device is triggered for operating, and the circuit is disconnected.

Figure 7:
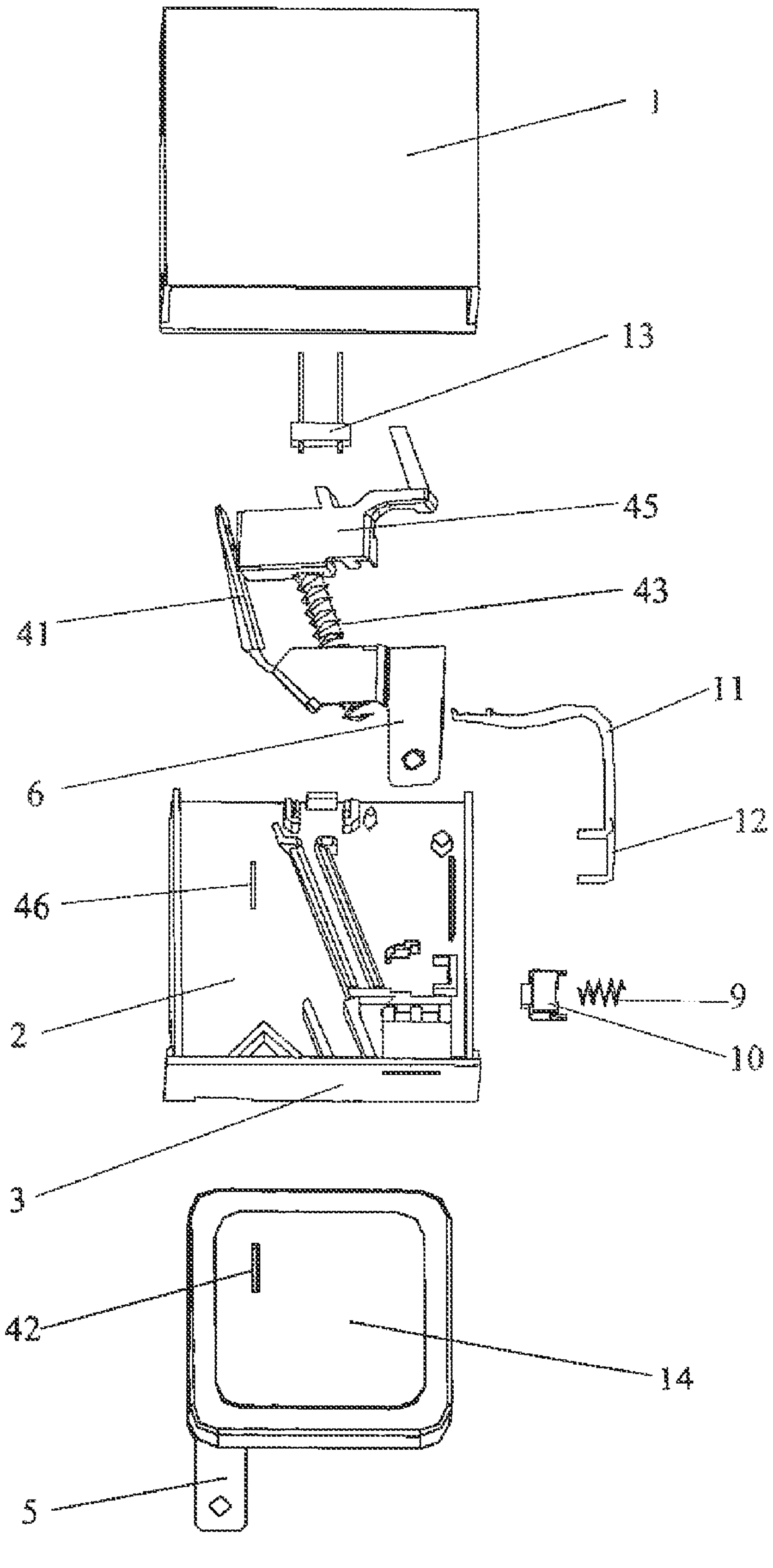
FIG. 7 is a component exploded view illustrating the thermally protected surge suppression device in normal operation state according to one embodiment of the present invention.

As seen in FIG. 7, it is a component exploded view illustrating the thermally protected surge suppression device in normal operation state according to the first embodiment of the present invention. The first embodiment includes the housing 1 made of engineering plastics and the base seat 3 with the mounting plate 2. The base seat with the mounting plate could be pushed into the housing 1. The base seat is equipped with the thermal protection device, and the surge suppression component 14 which is independently packaged could be directly set into the first cavity of the housing. The extension portion of the electrode a of the surge suppression component sticks out of the base seat to form a pin A 5 of the thermally protected surge suppression device, and the extension portion of an elastic conductive metal member 41 of the thermal protection device sticks out of the base seat to form the other pin B 6 of the thermally protected surge suppression device.

The thermal protection device further comprises the metal bulge 42 electrically connecting to the electrode b of the surge suppression component, the compression spring 43, the slider 45 with the arc extinguishing component made of engineering plastic movable on the guide-track groove of the mounting plate. The metal bulge 42 inserts into the second cavity via passing through the vertical hole 46 of the mounting plate and electrically connects to the thermal protection device.

The thermally protected surge suppression devices provided by the above-mentioned embodiments have the following advantages.

Because of the arc extinguishing component with a cavity, not only the movement of the arc extinguishing component functions in cooling and extinguishing the electric arc, but also the cavity of the arc extinguishing component covers the metal bulge, which enables the perimeter of the metal bulge isolated from the conductive metal member, to prevent the electric arc from moving around leading to short circuit, break the circuit timely and more safely, and solve the problem that the big power frequency fault current flows through the surge suppression component to cause fires.

The guide-track groove of the mounting plate is a guide-track groove tilted to the conductive metal member, when the compression spring pushes the arc extinguishing component of the slider to move upwards, on one hand, it provides the lateral thrust to push away the flexible conductive metal member, increases the disconnected safety distance and the resistance to lower the electric arc current; on the other hand, it obstructed the disconnected gap between the conductive metal member and the metal bulge. If the elasticity of the conductive metal member weakens, a disconnected gap of safety distance will be generated between the conductive metal member and surge suppression component.

The inner portion of the housing is divided into two adjacent cavities by the mounting plate, namely the first cavity and the second cavity. The first cavity is provided with the surge suppression component deposited therein, and the second cavity is provided with the thermal protection device deposited therein. In such manner the two independent cavities is insulated and fire-retardant, and can prevent from burning out the other electronic components. Moreover, the surge suppression component and the resin material with moisture-proof treatment are deposited in the first cavity; or the surge suppression component bare element without moisture-proof treatment is deposited in the first cavity, and then the resin material or the mixture of resin and quartz sand are filled therein. And it facilitates the fireproofing of the surge suppression component in case of failure. Furthermore, the surge suppression component is not easy to explode when the big surge current happens. The existing MOV is processed by common epoxy coating, and the coating layer would probably explode under big surge current.

While the invention has been described in connection with what are presently considered to be the preferred embodiments, it is definitely to be understood that the invention is not to be limited to the disclosed embodiments, but should be pointed out, as for the ordinary skilled in the technology, he could make modifications and equivalent arrangements within the spirit and scope of the invention, but they are in the protection of the present invention.

What is claimed is:

1. A thermally protected surge suppression device, comprising a housing and a base seat with a mounting plate, wherein a surge suppression component, a thermal protection device and a low temperature solder are set on the base seat;

the surge suppression component is provided with an electrode a and an electrode b, and an extension portion of the electrode a extends outside the base seat to form a pin A of the surge suppression device;

the thermal protection device is provided with a conductive metal member, and an extension portion of the conductive metal member extends outside the base seat to form a pin B of the surge suppression device; wherein the thermal protection device further comprises (a) a metal bulge electrically connected to the electrode b of the surge suppression component, (b) a compression spring, (c) a slider moveable on a guide-track groove of the mounting plate, and (d) an arc extinguishing component positioned at the top end of the slider;

when the thermally protected surge suppression device is operated at a rated voltage and a rated current, the conductive metal member is electrically connected to the metal bulge via the low temperature solder;

when the surge suppression component fails and its resistance lowers, power frequency faulty current is passed through the surge suppression component to heat the surge suppression component, making the low temperature solder melt, and the conductive metal member is disconnected from the metal bulge, and the arc extinguishing component on the slider is pushed to move by the compression spring so as to obstruct a gap resulted from the disconnection, and to generate an airflow to extinguish the electric arc in the gap between the conductive metal member and the metal bulge.

2. The thermally protected surge suppression device according to claim 1, wherein the base seat with the mounting plate is capable of being pushed into the housing, and inner portion of the housing is thus divided into two adjacent cavities by the mounting plate, namely a first cavity and a second cavity, with the surge suppression component being placed in the first cavity, and the thermal protection device being placed in the second cavity; and the surge suppression component is electrically connected to the thermal protection device by inserting the metal bulge into the second cavity.

3. The thermally protected surge suppression device according to claim 2, wherein the surge suppression component is subject to a moisture-proof treatment and then placed in the first cavity together with a resin material.

4. The thermally protected surge suppression device according to claim 2, wherein a surge suppression component bare element without moisture-proof treatment is placed in the first cavity, and then a resin material or a mixture of resin and quartz sands are filled into the first cavity.

5. The thermally protected surge suppression device according to claim 1, wherein the guide-track groove of the mounting plate is a guide-track groove tilted to the conductive metal member; when the surge suppression component is passed through power frequency fault current due to a decrease in resistance caused by failure of the surge suppression component, the arc extinguishing component of the slider is pushed to move upward by the compression spring such that the conductive metal member is pushed away to obstruct the gap between the conductive metal member and the metal bulge, and the airflow generated by the movement extinguishes the electric arc between the conductive metal member and the metal bulge.

6. The thermally protected surge suppression device according to claim 5, wherein the guide-track groove is set at an angle ranging from 45 to 75 degrees with respect to the underside of the base seat, and is cooperated with the compression spring to push the slider to move.

7. The thermally protected surge suppression device according to claim 1, wherein the surge suppression component is a metal oxide varistor, a gas discharge tube or a hybrid connected in series by a gas discharge tube and a metal oxide varistor.

8. The thermally protected surge suppression device according to claim 1, wherein the conductive metal member is a L-shaped elastic conductive metal member, and when the low temperature solder is melt, the L-shaped elastic conductive metal member is flicked sideways and automatically disconnected from the metal bulge.

9. The thermally protected surge suppression device according to claim 1, wherein the conductive metal member is a conductive metal member with a soft flexible wire and when the low temperature solder is melt, the conductive metal member with a soft flexible wire is pushed apart by the arc extinguishing component of the slider and disconnected from the metal bulge.

10. The thermally protected surge suppression device according to claim 1, wherein the arc extinguishing component is an arc extinguish chamber with an upward opening, which chamber is defined by a bottom side, three sidewalls and the mounting plate; when the arc extinguishing component is pushed by the spring moving into place, the metal bulge is covered by the chamber of the arc extinguishing component.

11. The thermally protected surge suppression device according to claim 1, wherein the arc extinguishing component is made of high molecular weight polymeric materials capable of generating gas in case of arc ablation, and the high molecular polymer materials are selected from a group consisting of resin, delrin and nylon.

12. The thermally protected surge suppression device according to claim 1, wherein a lower end of the slider is further equipped with a compression spring guide rod which is connected to the compression spring; an upper end of the slider is provided with a working condition indication bar which is adapted to extend outside the housing to indicate working condition of the thermal protection device while the slider is moved.

13. The thermally protected surge suppression device according to claim 1, wherein sidewalls of the second cavity are further equipped with a shock absorption spring and a micro switch, and the micro switch is connected to a two-pin connector located at the top side of the mounting plate via leads; and the micro switch is triggered while the slider is moved, so as to control the operation of a warning circuit connected to the two-pin connector.

14. The thermally protected surge suppression device according to claim 1, wherein a metal driving slice and a micro switch are arranged on the top side of the mounting plate; when the slider is moved to press the metal driving slice, a warning circuit connected to the micro switch is triggered to work.

* * * * *